United States Patent [19]
Kerrigan et al.

[11] Patent Number: 6,075,697
[45] Date of Patent: Jun. 13, 2000

[54] USE OF PRESSURIZED ENCLOSURE FOR IMPINGEMENT COOLING OF ELECTRONIC COMPONENT

[75] Inventors: Brian Michael Kerrigan; M. Lawrence Buller, both of Austin; Jeffrey William Young, Round Rock, all of Tex.

[73] Assignee: International Business Machines Corporation, Armonk, N.Y.

[21] Appl. No.: 09/174,908

[22] Filed: Oct. 19, 1998

[51] Int. Cl.[7] ...................................................... H05K 7/20
[52] U.S. Cl. ............................................................ 361/695
[58] Field of Search .......................... 62/259.2; 361/683, 361/687–688, 696–697, 725–727; 454/184

[56] References Cited

U.S. PATENT DOCUMENTS

| | | | |
|---|---|---|---|
| 4,497,198 | 2/1985 | Romano et al. ......................... | 361/695 |
| 5,136,465 | 8/1992 | Benck et al. ............................ | 361/695 |
| 5,159,528 | 10/1992 | Murphy .................................... | 361/695 |
| 5,338,214 | 8/1994 | Stetter et al. ........................... | 361/683 |
| 5,754,396 | 5/1998 | Felcman et al. ........................ | 361/683 |
| 5,926,367 | 7/1999 | Gutierrez et al. ....................... | 361/695 |

*Primary Examiner*—Gregory Thompson
*Attorney, Agent, or Firm*—Casimer K. Salys; Michael E. Noe; Andrew J. Dillon

[57] ABSTRACT

A computer has an internal chassis which is mounted within an enclosure. A variety of electronic components including a motherboard, a power supply and a ventilation fan are mounted to the chassis. The power supply has a small housing located within the enclosure. The housing is shaped to span the motherboard and requires no ducting. The ventilation fan is mounted to an inlet opening of the housing so that air is forced through the power supply before exiting the enclosure. The ventilation fan also pressurizes the housing such that a small, strategically located vent may be used to allow impingement cooling of other motherboard components.

11 Claims, 3 Drawing Sheets

6,075,697

USE OF PRESSURIZED ENCLOSURE FOR IMPINGEMENT COOLING OF ELECTRONIC COMPONENT

TECHNICAL FIELD

This invention relates in general to electronic computers and in particular to cooling a selected component located within the enclosure of a computer.

BACKGROUND ART

Electronic computers house a variety of electronic components such as printed circuit boards, an internal modem, connectors, a ventilation fan, a power supply and the like. Typically, the fan is located at an outlet side of the power supply so that air is drawn through the power supply to cool it before being expelled out of the enclosure. Each of these components is mounted to a chassis which is located inside an external housing or enclosure. The enclosure also protects the exposed components from physical contact and shields the components from electromagnetic interference.

The electrical components of the computer generate a significant amount of heat during operation. In smaller enclosures, the watt density of other electronic components on densely packed cards is large enough to cause them to overheat without adequate airflow across their respective heatsinks. Prior art computers have addressed this issue by employing a secondary ventilation fan. Unfortunately, an additional fan may create an unacceptable acoustically noisy operating condition. Although existing designs are workable, an improved cooling system for computers is needed.

DISCLOSURE OF THE INVENTION

A computer has an internal chassis which is mounted within an enclosure. A variety of electronic components including a printed circuit board, a power supply and a ventilation fan are mounted to the chassis. The power supply has a small housing located within the enclosure. The housing is shaped to span the printed circuit board and requires no ducting. The ventilation fan is mounted to an inlet side of the housing so that air is forced through the power supply before exiting the enclosure. The ventilation fan also pressurizes the housing such that a small, strategically located vent may be used to allow impingement cooling of a selected component.

BEST MODE FOR CARRYING OUT THE INVENTION

Figure 1:
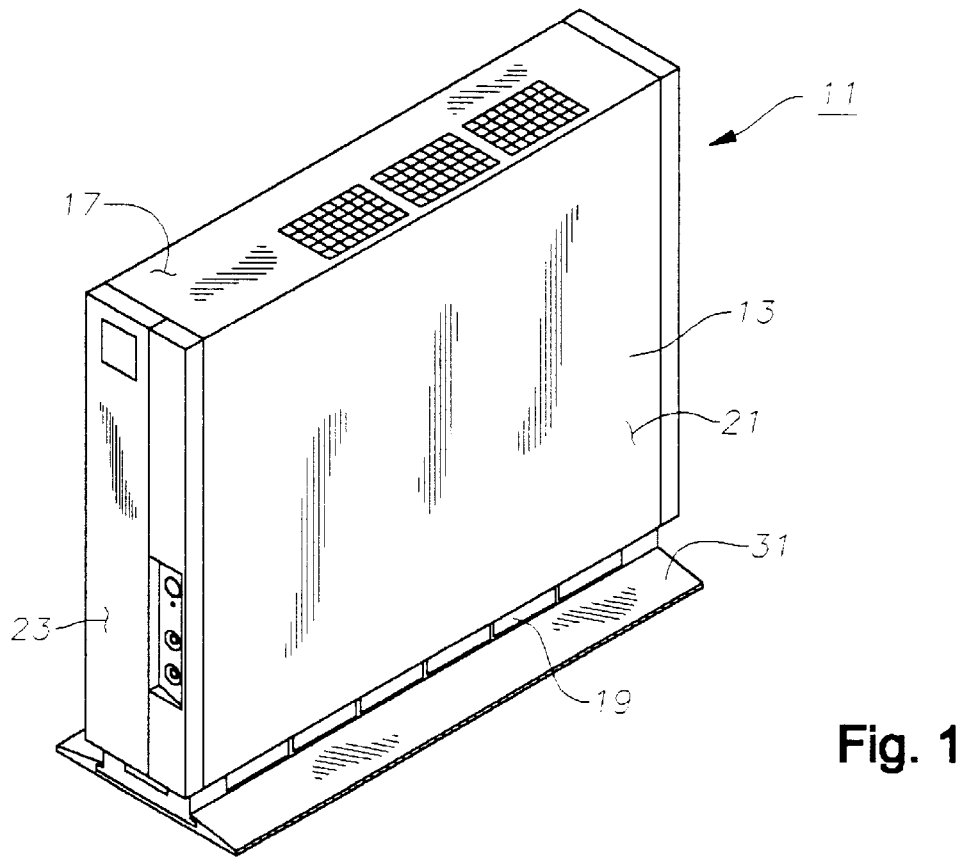
FIG. 1 is a front isometric view of a computer constructed in accordance with the invention.
Figure 2:
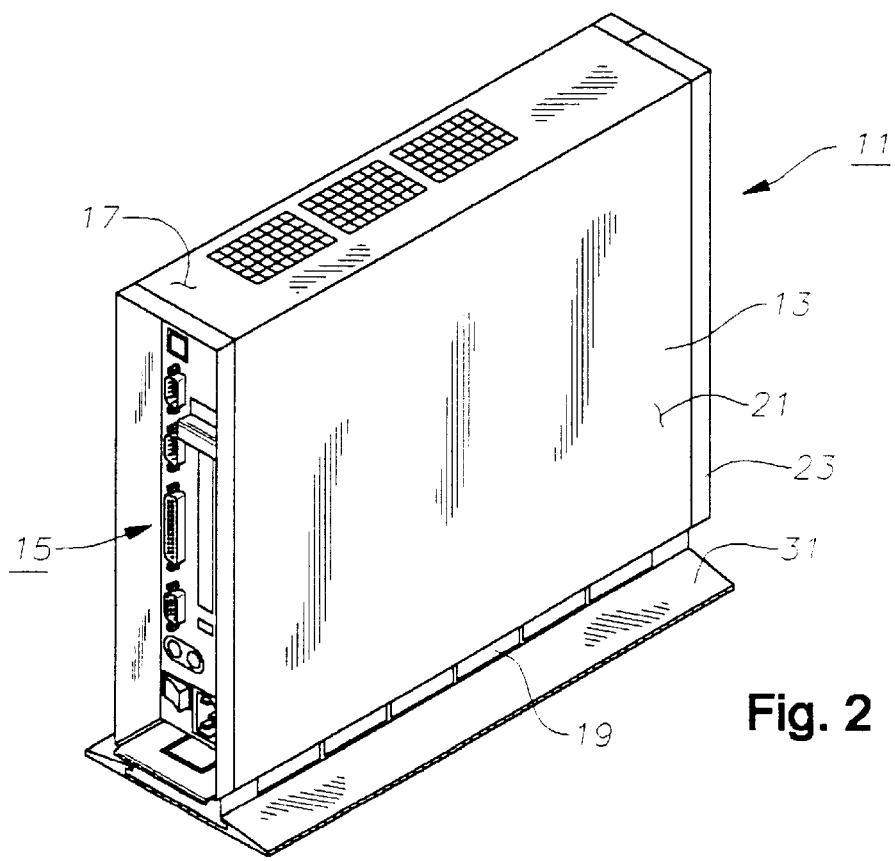
FIG. 2 is a rear isometric view of the computer of FIG. 1.

Referring to FIGS. 1 and 2, a network computer 11 is shown. Computer 11 has an external metal housing or enclosure 13 and an internal metal frame or chassis 15. Enclosure 13 is essentially a five-sided rectangular box with an opening on a rearward end. Enclosure 13 has a top panel 17, a bottom panel 19, and two side panels 21, all of which are formed from a single sheet of metal which is bent to form four corners. A front panel 23 is integrally joined to the forward end of enclosure 13. Printed circuit boards and other electrical components (not shown) are also mounted to chassis 15 as is commonly done in the art. A base or pedestal 31 is mounted to the lower surface of bottom panel 19. Base 31 is only slightly larger than the area of bottom panel 19 and is significantly smaller than prior art designs.

Figure 3:
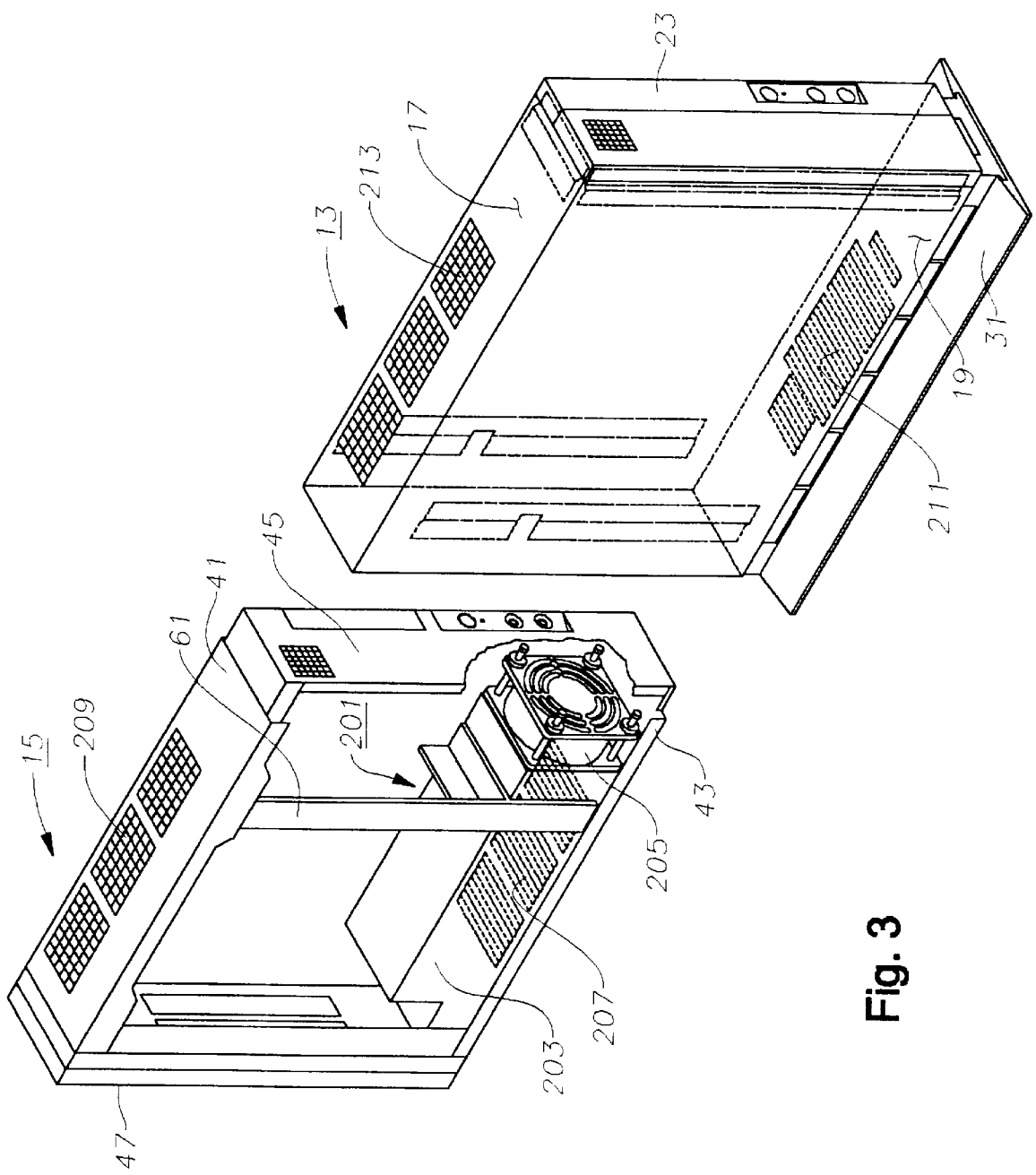
FIG. 3 is a front isometric, partially transparent view of the computer of FIG. 1 shown with its chassis removed from its enclosure and with its electronic components removed.

As shown in FIG. 3, chassis 15 is slidably mounted within enclosure 13. Chassis 15 has a rectangular perimeter of four wall-like frame members including a top 41, a bottom 43 and front and rear ends 45, 47. This configuration allows the vertical sides of chassis 15 to remain open and uncovered. A strut 61 is mounted to and extends vertically between top 41 and bottom 43.

Figure 4:
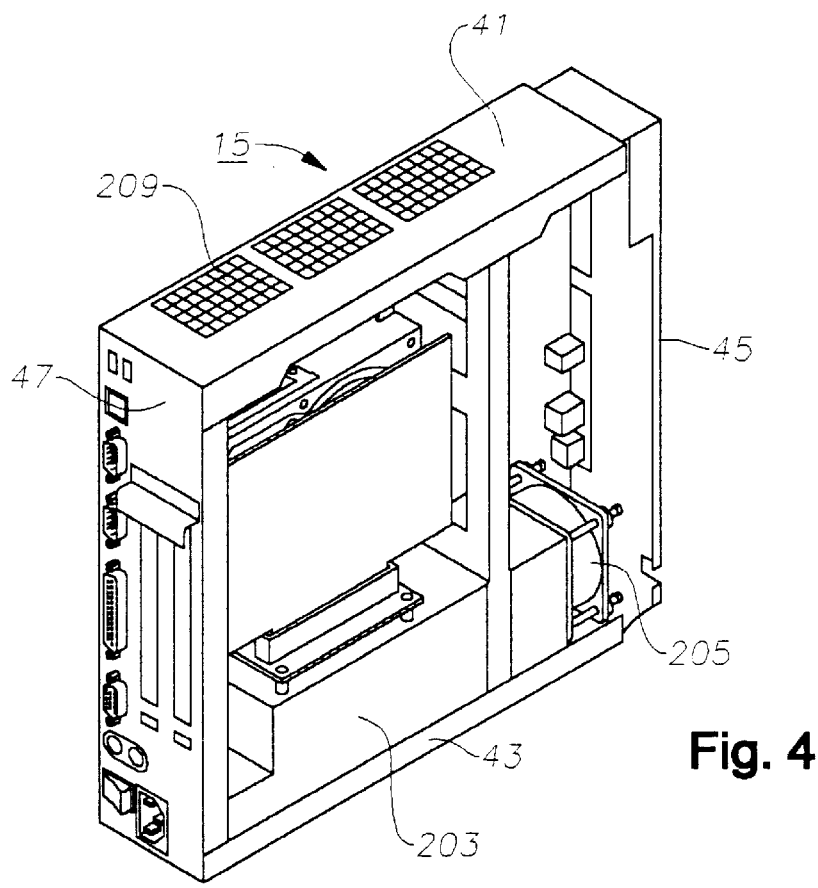
FIG. 4 is a rear isometric view of the chassis of FIG. 3 shown with its electronic components.

Referring now to FIGS. 3 and 4, chassis 15 also has a power supply 201 mounted to bottom 43. Power supply 201 has a square tubular sheet metal plenum or housing 203 with an opening on its forward end. A ventilation fan 205 is mounted to the opening and is located within a perimeter of chassis 15 and is spaced apart from a rearward side of front end 45 and the other sidewalls of chassis 15 and enclosure 13. Housing 203 is open on its lower side for communication with an air exhaust port 207 in bottom 43. An air intake port 209 is located at the upper end of chassis 15 in top 41. Ports 207, 209 have counterpart ports 211, 213, respectively, in enclosure 13. When chassis 15 is mounted in enclosure 13 (FIG. 4), port 207 aligns with port 211 and port 209 aligns with port 213. Housing 203 spans most of the length of chassis 15 from front to back.

Figure 5:
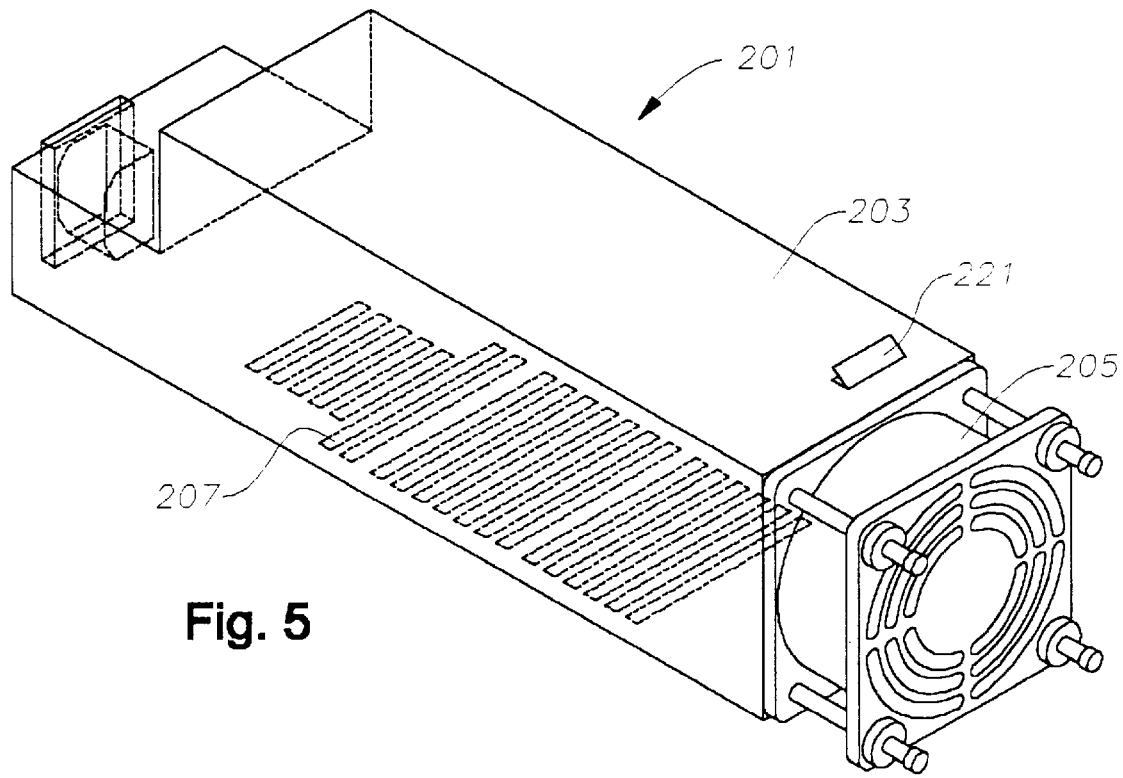
FIG. 5 is a isometric view of a power supply subassembly of the computer of FIG. 1.

As shown in FIG. 5, housing 203 also has a vent port 221 located in its upper surface. Vent port 221 is a small rectangular flap or baffle which has been cut from the sheet metal of housing 203. One of the four sides of the flap acts as a hinge so that the flap may be bent to a desired position to control the direction of the air stream exiting vent port 221.

In operation, enclosure 13 closely receives chassis 15 such that top panel 17 and bottom panel 19 slidably abut top 41 and bottom 43. In addition, the vertical side edge portions of top 41 and bottom 43 slidably engage side panels 21 to eliminate excessive movement between chassis 15 and enclosure 13. When ventilation fan 205 is on, ambient air will be drawn into computer 11 through air intake ports 213, 209. This air is circulated downward through the interior of computer 11 which is warmed by heat generated by the electrical components. The circulating air cools the electrical components and maintains them at a proper operating temperature. Ventilation fan 20 then draws the warmed air out of computer 11 and forces it into housing 203 at a pressurized level. The air passing through housing 203 flows past and cools power supply 201. The heated air is forced out of housing 203 and through exhaust ports 207, 211 where it is vented back into the ambient air.

A portion of the pressurized air flowing inside housing 203 is leaked through vent port 221 as a stream of impingement cooling air. The flap on vent port 221 may be used to direct the stream at an electrical component on a printed circuit board or other component which has increased cooling requirements.

The invention has significant advantages. This design does not require the use of a secondary fan and, thus, averts the expense, spatial requirements, complexity and acoustic noise associated with them. Since the power supply and housing are shaped to span the length of the motherboard, no ducting is needed.

While the invention has been shown or described in only some of its forms, it should be apparent to those skilled in the art that it is not so limited, but is susceptible to various changes without departing from the scope of the invention.

I claim:

1. A computer, comprising:

a chassis having a plurality of electronic components mounted thereto;

an enclosure surrounding the chassis and having an inlet port and an outlet port;

a plenum mounted to the chassis inside the enclosure in communication with the outlet port;

a ventilation fan mounted to the plenum for directing air drawn through the inlet port into the plenum; and a vent port in the plenum for directing a portion of the air flowing inside the plenum at a selected component located outside of the plenum for impingement cooling of the selected component.

2. The computer of claim 1 wherein the plenum has an inlet opening and an outlet opening which registers with the outlet port of the enclosure, the fan being mounted to the inlet opening.

3. The computer of claim 1 wherein the plenum essentially spans a length of the computer.

4. The computer of claim 1 wherein the plenum is mounted to a lower end of the chassis.

5. The computer of claim 1 wherein the vent port has a baffle for controlling the direction of the air flowing through the vent port.

6. The computer of claim 1, further comprising a power supply mounted inside the plenum.

7. A computer, comprising:

a chassis having a plurality of electronic components mounted thereto;

an enclosure surrounding the chassis and having an inlet port and an outlet port;

a plenum mounted to the chassis inside the enclosure and having an inlet opening and an outlet opening which registers with the outlet port of the enclosure;

a power supply mounted inside the plenum;

a ventilation fan mounted to the inlet opening of the plenum for directing air drawn through the inlet port into the plenum; and a vent port in the plenum for directing a portion of the air flowing inside the plenum at a selected component located outside of the plenum for impingement cooling of the selected component.

8. The computer of claim 7 wherein the plenum essentially spans a length of the computer.

9. The computer of claim 7 wherein the vent port has a baffle for controlling the direction of the air flowing through the vent port.

10. A method for impingement cooling of an internal component in a computer, comprising:

(a) providing a computer enclosure having an internal chassis with a plurality of electrical components mounted thereto, an inlet port and an outlet port;

(b) mounting a plenum in the enclosure over the outlet port;

(c) blowing cooling air drawn through the inlet port through the plenum and out the outlet port;

(d) directing a stream of the air flowing through the plenum through a vent port in the plenum toward a selected component located outside the plenum for impingement cooling of the selected component.

11. The method of claim 10, further comprising the step of mounting a ventilation fan to the plenum.

* * * * *